US012368500B2

(12) United States Patent
Bhaskar (10) Patent No.: US 12,368,500 B2
(45) Date of Patent: Jul. 22, 2025

(54) PRECODED RATE-SPLITTING WITH MULTIPLE SET-WISE COMMON STREAMS FOR AGGRESSIVE FREQUENCY REUSE IN A SATELLITE COMMUNICATION SYSTEM

(71) Applicant: Hughes Network Systems, LLC, Germantown, MD (US)

(72) Inventor: Udaya Bhaskar, North Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 306 days.

(21) Appl. No.: 17/896,784

(22) Filed: Aug. 26, 2022

(65) Prior Publication Data

US 2024/0072884 A1 Feb. 29, 2024

(51) Int. Cl.
*H04B 7/185* (2006.01)
*H04B 7/0456* (2017.01)
*H04W 52/18* (2009.01)

(52) U.S. Cl.
CPC ....... *H04B 7/18513* (2013.01); *H04B 7/0456* (2013.01); *H04W 52/18* (2013.01)

(58) Field of Classification Search
CPC .. H04B 7/0456; H04B 7/18513; H04W 52/18
See application file for complete search history.

(56) References Cited

U.S. PATENT DOCUMENTS

| 10,305,580 | B1 * | 5/2019 | Lee ............... H04L 25/03343 |
| 12,143,177 | B2 * | 11/2024 | Abdelsadek ........ H04B 7/0465 |
| 2017/0163333 | A1 * | 6/2017 | Breiling ........... H04B 7/15592 |
| 2018/0026709 | A1 * | 1/2018 | Buer ...................... H04W 4/00 |
| | | | 370/316 |

(Continued)

FOREIGN PATENT DOCUMENTS

| CN | 108809390 A | * 11/2018 | ........... H04B 7/0408 |
| WO | 2022037475 A1 | 2/2022 | |

OTHER PUBLICATIONS

Vazquez et al., "Rate Splitting for MIMO Multibeam Satellite Systems", VDE, WSA 2018; 22nd International ITG Workshop on Smart Antennas, Mar. 14-16, 2018 (Year: 2018).*

(Continued)

*Primary Examiner* — Shah M Rahman
(74) *Attorney, Agent, or Firm* — Kilpatrick Townsend & Stockton LLP (57) ABSTRACT

Techniques are described for precoded rate-splitting with multiple set-wise common messages for aggressive frequency reuse in a multi-beam satellites with co-channel interference. The satellite transmits private streams (PSs) to N user locations via spot beams. Embodiments identify K disjoint sets of the user locations (user groups) as being in adjacent spot beam coverage areas and having high channel vector collinearity. For each user group, data from the corresponding PSs is multiplexed to a respective set-wise common stream (SCS). PS precoders are each computed based on an associated target user location, and SCS precoders are each computed based on an associated target user group. The satellite allocates transmit power and transmits the N PSs and the K SCSs according to the PS beam weight vectors and the SCS beam weight vectors.

18 Claims, 7 Drawing Sheets

(56) References Cited

U.S. PATENT DOCUMENTS

| | | | | |
|---|---|---|---|---|
| 2023/0132338 A1* | 4/2023 | Stoica | ............... | H04B 7/0456 |
| | | | | 375/267 |
| 2023/0327725 A1* | 10/2023 | Wang | ............... | H04B 7/0469 |
| | | | | 370/329 |
| 2023/0422254 A1* | 12/2023 | Khoshnevisan | ...... | H04L 1/0041 |
| 2024/0146472 A1* | 5/2024 | Herath | ............... | H04B 1/7143 |

OTHER PUBLICATIONS

Joudeh et al., "Rate-Splitting for Max-Min Fair Multigroup Multicast Beamforming in Overloaded Systems", IEEE Transactions on Wireless Communications ( vol. 16, Issue: 11, Nov. 2017), pp. 7276-7289 (Year: 2017).*

Christensen et al., "Weighted Sum-Rate Maximization using Weighted MMSE for MIMO-BC Beamforming Design", IEEE Transactions on Wireless Communications, vol. 7, No. 12, pp. 4792-4799, 2008. (Year: 2008).*

Jaafar et al., "Multiple Access in Aerial Networks: From Orthogonal and Non-Orthogonal to Rate-Splitting", IEEE Open Journal of Vehicular Technology, vol. 1, pp. 372-392, Oct. 2020. (Year: 2020).*

Yin et al., "Rate-Splitting Multiple Access for Multigroup Multicast Cellular and Satellite Communications: PHY Layer Design and Link-Level Simulations", 2021 IEEE International Conference on Communications Workshops (ICC Workshops), Montreal, QC, Canada, Jun. 14-23, 2021, Total pp. 6 (Year: 2021).*

Ramirez et al., "Message-Splitting for Interference Cancellation in Multibeam Satellite Systems", 2018 9th Advanced Satellite Multimedia Systems Conference and the 15th Signal Processing for Space Communications Workshop (ASMS/SPSC), Berlin, Germany, Sep. 10-12, 2018, Total pp. 7 (Year: 2018).*

Joroughi et al., "Generalized Multicast Multibeam Precoding for Satellite Communications", Institute of Electrical and Electronics Engineers Transactions on Wireless Communications, vol. 16, No. 2, Feb. 1, 2017, pp. 952-966.

Application No. PCT/US2023/029378 , International Search Report and Written Opinion, Mailed On Dec. 4, 2023, 16 pages.

Perez-Neira et al., "Non-Orthogonal Transmission Techniques for Multibeam Satellite Systems", Institute of Electrical and Electronics Engineers Communications Magazine, vol. 57, No. 12, Dec. 1, 2019, pp. 58-63.

Yin et al., "Rate-splitting Multiple Access for Multibeam Satellite Communications", Institute of Electrical and Electronics Engineers International Conference on Communications Workshops (ICC Workshops), Feb. 5, 2020.

Joham, M., "Linear Transmit Processing in MIMO Communications Systems," *IEEE Transactions on Signal Processing*, vol. 53, No. 8, Aug. 2005, 13 pages.

Sadek, M., "A Leakage-Based Precoding Scheme for Downlink Multi-User MIMO Channels," *IEEE Transactions on Wireless Communications*, vol. 6, No. 5, May 2007, 11 pages.

Yalcin et al., "Precoder Design for Multi-group Multicasting with a Common Message," arXIV:1812.00433v3 [eess.SP] Jun. 2, 2019, 31 pages.

Yin et al., "Rate-Splitting Multiple Access for Multigroup Multicast and Multibeam Satellite Systems," arXiv:2008.05091v2 [eess.SP] Nov. 9, 2020, 15 pages.

* cited by examiner

PRECODED RATE-SPLITTING WITH MULTIPLE SET-WISE COMMON STREAMS FOR AGGRESSIVE FREQUENCY REUSE IN A SATELLITE COMMUNICATION SYSTEM

BACKGROUND

Very high-throughput satellite (VHTS) systems, such as some modern geosynchronous (GEO) satellite systems, illuminate respective coverage areas with spot beams. In such systems, various techniques are used to limit interference in one spot beam from communications in neighboring spot beams. For example, while it is desirable for receivers in the coverage area of a particular spot beam to receive and decode signals communicated by the satellite via that spot beam, those same receivers may also undesirably receive interfering communications from one or more adjacent spot beams.

A common technique for reducing such interference is to divide the frequency spectrum used by the satellite into bands and to assign different bands to adjacent spot beams. For example, a four-color system divides the spectrum assigned to a satellite into four "colors" (e.g., sub-bands, polarizations, etc.); a reuse pattern seeks to ensure that adjacent beams do not use the same color, so that communications from adjacent spot beams are effectively orthogonal and non-interfering. However, such systems are inefficient because each spot beam can only be allocated one-quarter of the available spectrum, which appreciably reduces the maximum information rate that can be supported by each spot beam. Thus, several approaches seek to allocate more (e.g., half, or even all) of the available spectrum to each spot beam without causing an unacceptable increase in interference.

One such approach is called precoding. Precoding generally seeks to steer and null spot beam responses so that the beam response of each spot beam is high within its associated spot beam coverage area, but sharply drops off to little or no spot beam response in adjacent spot beam coverage areas. In this way, a receiver in the spot beam coverage area receives very little or no interference from adjacent spot beams. Precoding involves computing and applying beam weight vectors that result in patterns of constructive and destructive interference corresponding to defined spot beam boundaries. While such approaches can effectively suppress interference response in a spot beam coverage area, such approaches tend also to suppress the desired response in the spot beam coverage area. For example, with precoding, some of the transmit power that would have been used to transmit desired beam information is reallocated to transmit information for interference reduction.

Another such approach is called rate-splitting. For any spot beam transmission, a portion of the transmission power results in the desired signal being transmitted in the spot beam (referred to herein as the "private stream"), and another portion of the transmission power results in interference noise in other spot beams. As such, reducing transmission power can reduce interference levels, but doing so can also proportionally reduce desired signal levels (e.g., signal to interference plus noise ratios (SINR) can tend to remain relatively constant). Rate-splitting approaches acknowledge that satellite systems are already designed to receive and decode private streams within an acceptable amount of noise (e.g., a non-zero noise floor), and there is no need to reduce interference below the noise floor. Instead, rate-splitting approaches can pull some of the transmission power from private stream transmissions across all the spot beams that is effectively going to transmission of interference and can reallocate that power to transmission of a single "common stream." The common stream is a low-information-rate multiplex of information pulled from all the private streams.

Notably, while the reduced power private streams create lower interference, the additional common stream creates another source of interference. Because of the low information rate, a receiver can first decode the received common stream, extract decoded information relevant to the receiver, and subtract the decoded information thereby effectively removing its interference contribution from the private stream. A conventional limitation to rate-splitting is that the common stream must be decodable by all (even the most disadvantaged) receivers in the system, such that the most disadvantaged receiver effectively defines the maximum information rate for the common stream. As the number of receivers increases, the information rate of the common stream tends to decrease until it is so low that only a negligible amount of power and data can be reallocated from the private streams to the common stream.

SUMMARY

Embodiments include systems and methods for precoded rate-splitting with multiple set-wise common messages for aggressive frequency reuse in a satellite communication system. For example, embodiments can operate in context of a two-color reuse pattern satellite architecture, a one-color reuse pattern satellite architecture, or any other satellite architecture in which at least some adjacent spot beam coverage areas share a same spectrum allocation and polarization. The satellite transmits private streams (PSs) to N user locations via spot beams. Embodiments identify K sets of the user locations, such that each set includes a respective subset (e.g., pairs) of user locations in adjacent spot beam coverage areas identified as having collinear channel vectors with respect to their PSs. For each set, a portion of data is pulled from the PSs of the set and allocated to a respective one of K set-wise common streams (SCSs). A precoder computes PS beam weight vectors to optimize beam forming for each PS with respect to its associated user location, and the precoder computes SCS beam weight vectors to optimize beam forming with respect for each SCS with respect to its associated set of user locations. The satellite allocates transmit power and transmits the N PSs and the K SCSs according to the PS beam weight vectors and the SCS beam weight vectors.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques described herein provide a novel precoded rate-splitting with multiple set-wise common streams to improve the outroute capacity of a multibeam satellite system under aggressive frequency reuse. Existing very high throughput satellite (VHTS) systems typically employ highly directive antenna far field patterns (referred to herein as "spot beams") with 3 or 4 color frequency reuse are routinely used by multi-beam satellite systems to manage co-channel interference between beams. This provides each beam with ⅓ or ¼ of the total available downlink spectrum resource. A more aggressive 2-color frequency reuse increases the per-beam resource by a factor of 2 and 1.5 respectively over 4 color and 3 color reuse. With full frequency reuse (1-color), the corresponding increases are by a factor of 4 and 3. However, such aggressive frequency reuse approaches also tend to increase co-channel interference in order to realize any practical increase capacity.

Precoding is conventional technique to reduce such co-channel interference for the forward downlink, but conventional precoding has several limitations. While precoding treats interference as noise, rate-splitting approaches convert a portion of interference power to an information-bearing common stream, such as a single common message for all spot beams. This productive use of interference power can tend to increase overall system capacity. However, when the number of beams is large, a single common message is not effective in increasing the system capacity.

Embodiments described herein include novel approaches to combining rate-splitting with precoding by grouping users with similar channel vectors into sets, forming rate-splitting set-wise common streams for each of the user groups, and computing per-user precoders for private user streams and set-wise precoders for set-wise common streams. Available transmit power can be allocated to per-user private streams and set-wise common streams, according to the precoders. Formation and utilization of multiple set-wise common streams provides scalable performance improvements, such as in context of large number of cells covering a large geographical region.

Figure 1:
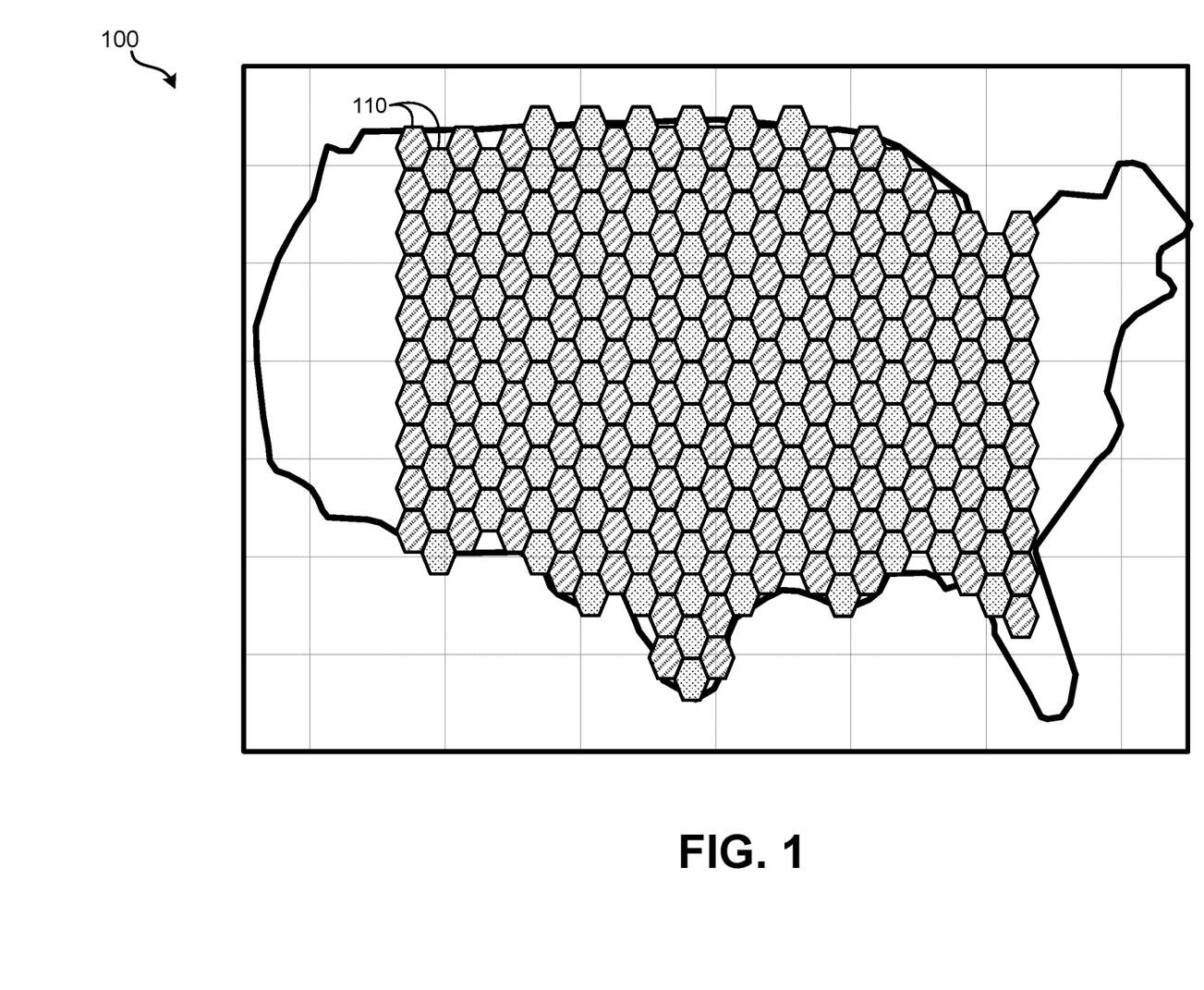
FIG. 1 shows an example of a two-color reuse pattern of spot beam coverage areas ("cells") covering most of the Continental United States (CONUS).

For the sake of context, FIG. 1 shows an example of a two-color reuse pattern 100 of spot beam coverage areas ("cells") 110 covering most of the Continental United States (CONUS). For example, a satellite projects a large number of spot beams over the surface of CONUS so that each spot beam forms a cell 110. As used herein, the "color" of a cell 110 indicates its frequency allocation and polarization (or polarization orientation). For example, in the illustrated two-color reuse pattern 100, each color can correspond to one of two orthogonal polarizations in a same frequency band. In the illustrated arrangement, columns of cells 110 alternate between left-hand circular polarization (LHCP) and right-hand circular polarization (RHCP). For example, cells 110 in every other column are simultaneously served by the same frequency band and same polarization. Within a cell 110, interference tends to be higher at the edges and reduces towards the center. For example, the best signal to interference noise (SINR), and correspondingly the best reception characteristics, tend to be toward the center of a cell 110.

In such a column-wise two-color reuse pattern 100, co-channel interference is primarily between neighboring cells along a column. For example, the highest interference for a particular cell 110 comes from the cell 110 directly to its north and/or from the cell 110 directly to its south. Interference from further away cells in the same column tends to be lower, and interference between columns is much lower, or even negligible. Embodiments described herein seek to reduce co-channel interference between "neighboring" or "adjacent" cells. Unless otherwise indicated, reference to such neighboring or adjacent cells intends to refer generally to those neighboring or adjacent cells 110 with which a particular cell 110 is likely to interfere (e.g., close-by cells 110 in the same column in the illustrate arrangement).

Figure 2:
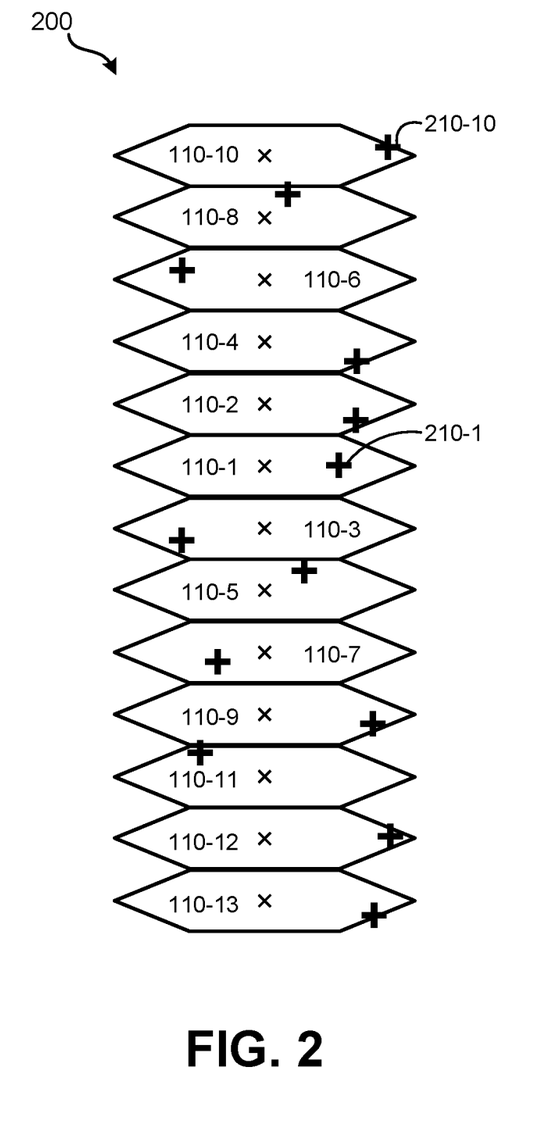
FIG. 2 shows an example layout of a single column of same-color cells (e.g., of the two-color reuse pattern of FIG. 1) for added context.

On the satellite out-route, in any time frame (e.g., a DVB-S2X superframe), a scheduler selects one or more users in each cell 110 for receiving a transmission. The selection of users and the number of users per cell 110 is driven by considerations, such as traffic backlog, priority of traffic, latency requirements, traffic distribution etc. FIG. 2 shows an example layout 200 of a single column of same-color cells (e.g., of the two-color reuse pattern 100 of FIG. 1) for added context. In the illustrated layout 200, a single "user location" 210 is selected in each cell 110. For example, user location 210-10 represents the user location 210 in cell 110-10, user location 210-1 represents the user location 210 in cell 110-1, etc. As used herein, a user location 210 can refer to a location of a receiver of a single user, or one or more receivers of a cluster of users (e.g., with small geographical separation). Terms, such as "user," user location," "receiver," etc. are generally interchangeable for purposes of this disclosure. It is assumed that, because the cells 110 are all of a same color (the same frequency and polarization), simultaneous transmission to the user locations 210 in the neighboring cells 110 will cause co-channel interference. System throughput can be improved by mitigating this co-channel interference.

Figure 3:
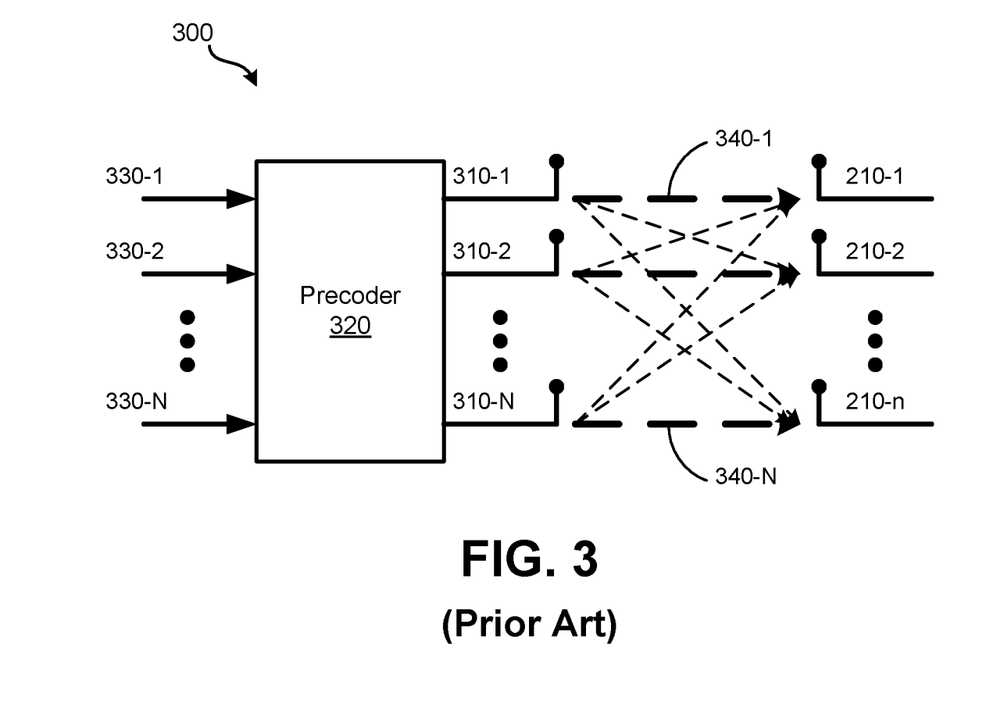
FIG. 3 shows a conventional simplified satellite communications system model of N satellite spot beams serving N cells for further context.

FIG. 3 shows a conventional simplified satellite communications system model 300 of N satellite spot beams 310 serving N cells 110 for further context. The N cells 110 can be in any suitable arrangement that results in co-channel interference, such as a cells 110 of a single column of a two-color reuse as in FIG. 2. As illustrated, the system model 300 can include a conventional precoder 320 that receives N "private streams" 330, each intended to be decoded only by the user or users of a target user location 210 in a targeted cell 110.

The maximum bit rate at which each private stream 330 can be transmitted is limited by the fraction of the total available transmit power allocated to that private stream 330 and transmit channel 340 characteristics. The transmit channel 340 characteristics include interference from the other private streams 330 and noise level at the receiver or receivers in the target user location 210. In two-color or one-color reuse pattern implementations, users closer to cell 110 edges tend to experience higher interference than noise, which tends to limit the bit rate. Unless the interference level is reduced, system capacity under aggressive reuse may show little or no improvement over more conventional 3 or 4 color reuse schemes, despite the increased bandwidth per beam.

The illustrated system model 300 includes a conventional linear precoder 320. Linear precoding is a technique that can be used in a transmitter to reduce interference level in a transmit channel 340, provided the transmitter has a reasonably accurate knowledge of the transmit channel 340 characteristics. For example, in an ideal multi-beam satellite system, each nth satellite beam can be modeled as a transmission 310 that is intended to serve a user location 210 in an nth user location 210 (in an nth cell 110). However, in a real-world multi-beam satellite system, each nth user location 210 receives from the nth satellite beam (e.g., from the nth transmission 310n) and all other satellite beams having co-channel interference with the nth satellite beam. As such, the system model 300 is illustrated as N transmissions 310 (e.g., satellite beams) serving a respective user location 210 (e.g., a single antenna receiver or cluster of receivers) where each user location 210 (in each of N cells 110) receives the intended transmission 310 plus interference from all other transmissions 310. Thus, the characteristics of any given transmit channel 340 can be modeled to account for contributions from all N satellite beams (e.g., even where some of those contributions may be negligible).

The transmit channel 340 characteristics can be described by a channel matrix H, which indicates complex channel gains between N beams and N users. For example, a minimum mean squared error (MMSE) precoding technique can be used, which seeks to minimize mean squared error (MSE) between transmitted and received signals under a total transmit power constraint. Such precoding can be represented by the following equation:

$$y = H^\dagger W s + z,$$

where † denotes a complex conjugate transpose; 's' denotes a K×1 transmit signal vector of symbols to each of N receivers; 'W' denotes a N×N precoder matrix of N×1 private precoder vectors, [$w_1$ $w_2$ ... $w_N$]; 'H' denotes a N×N channel matrix of N×1 channel vectors, [$h_1$ $h_2$ ... $h_N$]; 'y' denotes a N×1 received signal vector at each of N receivers; and 'z' denotes a N×1 receiver noise vector at each of N receivers, CN (0, $\sigma^2$).

The MMSE optimization results in a precoder matrix W given by:

$$W = \beta * H \left( H^\dagger H + \frac{K\sigma^2}{P_{tot}} I_K \right)^{-1}$$

where '$P_{tot}$' denotes a total available transmit power; 'β' denotes a scalar gain to achieve total transmit power constraint (i.e., Trace($WW^H$)=$P_{tot}$); and '$I_K$' denotes a N×N identity matrix.

If the users in adjacent cells are sufficiently far apart, the MMSE precoder (precoder 320) can improve the signal to interference and noise ratio (SINR) in each cell, which in turn improves the system spectral efficiency (SE) leading to higher overall capacity. However, if the user spacing much smaller than the beamwidth, precoding can provide little or no improvement. For example, the precoding attempts to weight the transmissions 310 in a manner that causes constructive and destructive interference patterns that effectively manifest desired beam response characteristics (e.g., similar to beam forming). However, as user locations 210 become more geographically dense, it may not be possible to sufficiently reduce interference without also reducing the desired signal level. In such a case, system capacity is effectively limited by interference level, rather than noise level.

Figure 4:
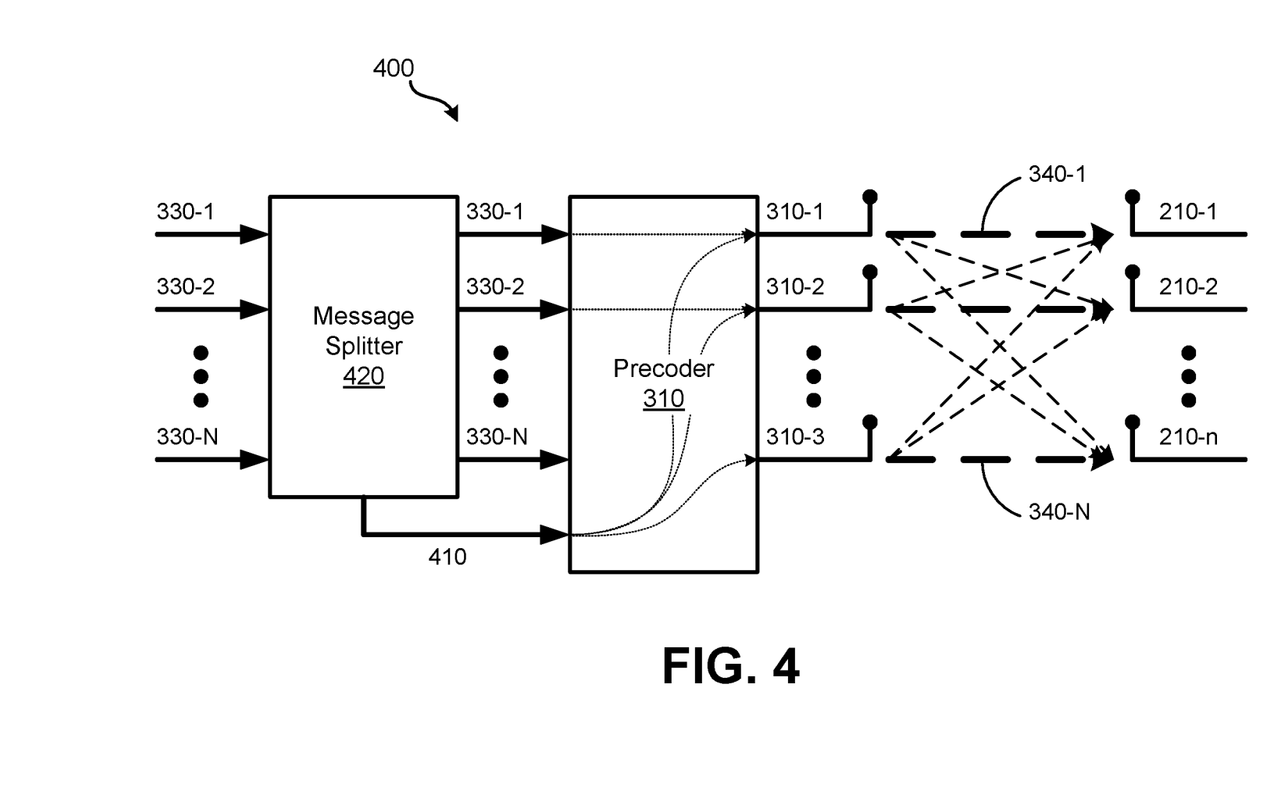
FIG. 4 shows a simplified satellite communications system model, for further context, that is similar to the system model of FIG. 3 with the addition of a message splitter to generate a single common stream by rate-splitting.

One approach to improving system capacity in some such cases is to use rate-splitting. FIG. 4 shows a simplified satellite communications system model 400, for further context, that is similar to the system model 300 of FIG. 3 with the addition of a message splitter 420 to generate a single common stream 410 by rate-splitting. Rate-splitting transfers some of the power contributing to co-channel interference (e.g., between private streams 330) into an information bearing common stream 410 shared among some or all of the N users. If the system is interference-limited, noise level can be much smaller than the interference level, so that the SINR approximately equals signal to interference ratio (SIR). Because rate-splitting is pulling transmit power away from the private streams 330, there is a resulting reduction in the level of mutual interference between private streams 330. However, since the SIR remains the same, there is little or no impact on spectral efficiency. Private stream 330 power can be reduced until the private stream 330 interference drops to a level comparable to noise level. The power taken out of the private streams 330 by the message splitter 420 can be used to create a common stream 410 without exceeding the total available power.

For such an approach to work, the generated common stream 410 cannot become a new source of interference with the private streams 330. Thus, the message splitter 420 selects an information rate for the common stream 410 that is low enough to be decodable at all the receivers in all user locations 210, including even the most disadvantaged receiver with the lowest SINR. This allows the receivers to use advanced detection techniques to first recover the common stream 410, remove its interference, and recover its associated private stream 330 without any common stream 410 interference. In typical operating scenarios, even with a relatively small number of receivers, ensuring that the common stream 410 can be decoded by all the receivers tends to necessitate setting a very low information rate for the common stream 410. Nonetheless, in interference-limited cases, even such a low-information-rate common stream 410 can make a non-negligible contribution to the overall throughput of the system 400.

The illustrated system model 400 uses a traditional rate-splitting type of approach to generate a single common stream 410 from all of the N private streams 330. Each of the transmissions 310 includes a respective private stream 330 for a respective target user location 210 and the common stream 410. Such an approach tends to work only for small values of N. As the number of cells 110 (user locations 210) becomes large, the rate of the single common stream 410, which is limited by the receiver with the worst SINR, tends to approach zero. Thus, as N increases, any contribution to system capacity resulting from a traditional application of rate-splitting (generation of a single common stream 410) tends to decrease to a negligible level.

Traditional rate-splitting tends to generate only a single common stream 410 (as in FIG. 4) for several reasons. One reason is that each additional common stream 410 that is transmitted is potentially yet another source of interference with the private streams 330 and with all other common streams 410. Another related reason is that mitigating the added interference from increasing numbers of common streams 410 can traditionally involve undesirably increasing the complexity of receivers to be able to decode the increasing numbers of common streams 410. As such, traditional applications of rate-splitting tend to be applicable only to systems with small numbers of users.

Figure 5:
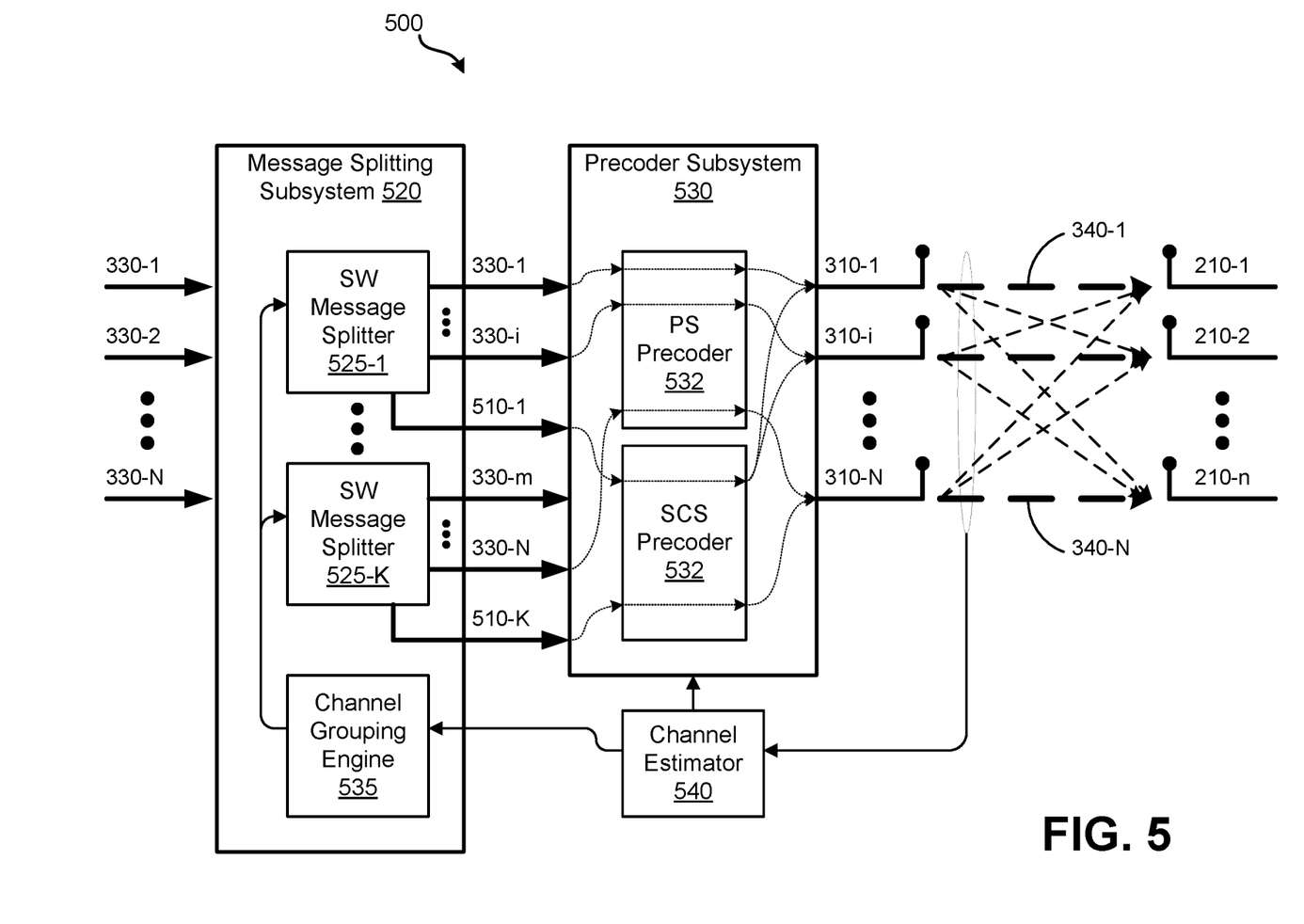
FIG. 5 shows a simplified satellite communications system that uses rate-coding to generate multiple set-wise common streams from N private streams and applies separate precoding to both the private streams and the set-wise common streams, according to various embodiments described herein.

Embodiments described herein provide a novel precoded rate-splitting approach that generates multiple set-wise common streams for aggressive frequency reuse. FIG. 5 shows a simplified satellite communications system 500 that uses rate-coding to generate multiple set-wise common streams 510 from N private streams 330 and applies separate precoding to both the private streams 330 and the set-wise common streams 510, according to various embodiments described herein. A channel grouping engine 535 of the message splitting subsystem 520 groups user locations 210 into sets (e.g., two or more) having similar associated channel vectors. The message splitting subsystem 520 can then generate a respective set-wise common stream (SCS) 510 for all user locations 210 in each set without any user location 210 appreciably disadvantaging the other user locations 210 in the set. For example, even though the information rate for each SCS 510 is selected to be decodable by all receivers for all user locations 210 in the set, the selected information rate is closer to optimal for all receivers in the set because all receivers in the set have similar transmit channel 340 characteristics.

As illustrated, the message splitting subsystem 520 can include K set-wise message splitters 525, each to generate a respective one of K SCSs 510 associated with a respective one of K sets of user locations 210. The channel grouping engine 535 groups the user locations 210 into at least two sets (i.e., K is an integer greater than 1), and each of the K sets includes at least two user locations 210. As described further below, the channel grouping engine 535 groups the user locations 210 into sets based on identifying those of the user locations 210 having most similar transmit channel 340 characteristics, such as highest channel vector collinearity. For example, a channel estimator 540 can determine transmit channel 340 characteristics by receiving measurement feedback from receivers, by estimation, and/or in any other suitable manner. The channel estimator 540 can provide determined transmit channel 340 characteristics to the channel grouping engine 535 (and also to the precoder subsystem 530).

In some embodiments, each set has the same number of user locations 210; each set is a group of N/K user locations 210. In one implementation, each set is a pair of user locations 210 (i.e., exactly two user locations 210). In other embodiments, sets can have different numbers of user locations 210. In some embodiments, the channel grouping engine 535 is configured to force all user locations 210 into a set. In other embodiments, after generation of the K sets of user locations 210, one or more of the N user locations 210 can remain unassigned to any set.

The message splitting subsystem 520 receives N private streams (PSs) 330, each to be transmitted to a respective one of N user locations 210 in a respective one of N cells 110 via a respective one of N transmit channels 340. In some implementations, the message splitting subsystem 520 may receive streams corresponding to the private streams 330, and not the PSs 330 themselves; for the sake of simplicity, the description will consider this as the message splitting subsystem 520 receiving the PSs 330. The channel grouping engine 535 groups the user locations 210 into K sets. After grouping the user locations 210 into K sets, each of K set-wise message splitters 525 is associated with a respective one of the sets (i.e., a kth set-wise message splitter 525 is associated with a kth set of user locations 210). In some implementations, the channel grouping engine 535 always forms a predetermined number of sets, and there is always that number of set-wise message splitters 525 (i.e., K is fixed). In other implementations, the channel grouping engine 535 groups the user locations 210 into a suitable number of sets, and that number of set-wise message splitters 525 is instantiated, or otherwise invoked (i.e., K is variable). For example, as described below, a greedy algorithm, or the like, can be used to iteratively group together sets of user locations 210 until some ending criterion is met; the resulting number of sets is K.

As such, each kth set-wise message splitter 525 receives a respective kth portion of the N PSs 330. For example, a first set-wise message splitter 525-1 receives a first two or more PSs 330 indicated as PS 330-1 . . . PS 330-$i$, and a Kth set-wise message splitter 525-K receives a first two or more PSs 330 indicated as PS 330-$m$ . . . PS 330-N. While FIG. 5 shows all N of the PSs 330 being assigned to sets, the channel grouping engine 530 may group user locations 210 in a manner that results in one or more user locations 210 not being assigned to any sets. Based on the transmit channel 340 characteristics (e.g., channel vectors) associated with the user locations 210 (i.e., with all receivers) in each kth set, each kth set-wise message splitter 525 selects a maximum information rate that would be decodable by all receivers of the kth set. Based on the selected information rate, each kth set-wise message splitter 525 pulls a corresponding portion of data from each of its kth set of the PSs and multiplexes the pulled portion of data to generates a respective kth SCS 510 at the determined information rate.

Embodiments of the channel grouping engine 535 can group user locations 210 so that the corresponding group of transmit channels 340 has a maximized collinearity. Each transmit channel 340 can be described by a channel vector h. For example, h is generated for each transmit channel 340 by the channel estimator 540. For the sake of simplicity, the grouping will be described for cases in which user locations 210 are paired. For two user locations 210 in two cells 110 ($m$ and $n$) having associated channel vectors $h_m$ and $h_n$, collinearity can be defined as:

$$C_{mn} = |h_m^\dagger h_n| / \|h_m\| \|h_n\|$$

A greedy algorithm can be used to pair (or otherwise group) users in an iterative manner. In one implementation, the greedy algorithm begins by computing a respective collinearity $C_{mn}$ for all pairs of user locations 210, $m=1, \ldots, N, n=1, \ldots, N$. In each xth iteration, an xth pair is identified as having the highest collinearity of all of the pairs. In the first iteration, all N user locations 210 can be considered as candidates for grouping into a pair. In some implementations, the pair is only identified if both user locations 210 in the pair meet at least a minimum collinearity threshold, $C_{MIN} > 0$. For example, a pair of the user locations 210 (i and j) is identified as the xth pair if $C_{ij} \geq C_{MIN}$ and $C_{ij} \geq C_{mn}$, $m=1, \ldots N, n=1, \ldots, N$. Still in the xth iteration, the identified pair of user locations 210 is removed as candidates for future grouping. For example, collinearities associated with those user locations 210 can be set to below the minimum collinearity threshold (e.g., set $C_{ij}=C_{ji}=0$). The greedy algorithm iteratively repeats identification of pairs as groups until no further groupings can be made. For example, the iterations can end when no more user locations 210 remain to be paired, or when no more user location 210 pairs have associated collinearities meeting the minimum collinearity threshold. For example, depending on the value of $C_{MIN}$, i.e., if $C_{MIN}>0$, some user locations 210 may not be paired because their collinearity is too low with any of the other user locations 210. Such user locations 210 may receive only PSs 330 and no SCSs 510. For example, in implementations that use pairwise groupings, K can be less than N/2.

While the above approach is described in context of pairwise groupings of user locations 210, the approach can be extended to sets with any suitable number of user locations 210, including groups of more than two user locations 210. Rather than computing collinearities for all pairs of users, collinearities can be computed for combinations or permutations of user locations 210. In some implementations, a group size (S) is determined, and a respective collinearity is computed for each permutation of S out of the N user locations 210 (i.e., NPs). In each xth iteration, there are a remaining M candidate permutations to select for assignment to an xth set of user locations 210. In the first iteration, M is the total number of permutations (i.e., M=N!/(N–S)!). At the end of each iteration, all permutations involving the selected S user locations 210 are removed as candidates for subsequent iterations, until no further groups of S user locations 210 can be identified as sets (e.g., no user locations 210 are left to assign, or all collinearities of remaining candidate permutations are below the minimum collinearity threshold). Other embodiments can be implemented with multiple group sizes. For example, multiple sets of collinearities can be computed for permutations of different group sizes (e.g., S1, S2, etc.), and the greedy algorithm can similarly iterate through selecting highest remaining candidate collinearities in each iteration.

Figure 6:
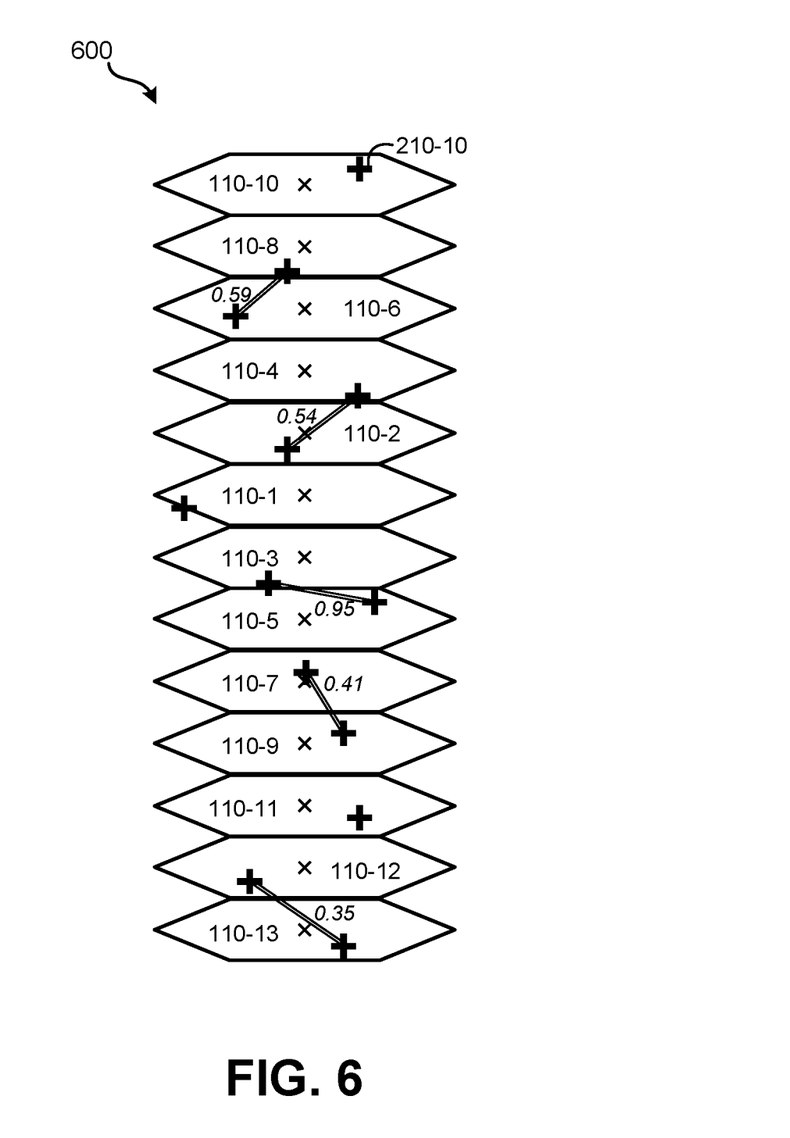
FIG. 6 shows an example of a simulation output for pairwise grouping of user locations in cells having co-channel interference, according to various embodiments described herein.

For the sake of illustration, FIG. 6 shows an example of a simulation output 600 for pairwise grouping of user locations 210 in cells 110 having co-channel interference, according to various embodiments described herein. The simulation output 600 shows a column of cells 110 of a same color (i.e., a same polarization and same frequency allocation). Each cell 110 is shown as having a randomly placed user location 210. The simulation used a greedy algorithm, such as described above, to pair the user locations 210 into sets based on maximizing collinearity of channel vectors.

Identified sets (pairs) of user locations 210 are indicated by double-lines joining the user locations 210. Values in italics next to the double-lines show example collinearity values output by the simulation. For example, the set of user locations 210 in cells 110-6 and 110-8 yielded a collinearity of 0.59. A minimum collinearity threshold of 0.3 was used in the simulation. Because of the non-zero minimum collinearity threshold, the simulation resulted in three unpaired user locations 210 in cells 110-1, 110-10, and 110-11.

Returning to FIG. 5, each kth set-wise message splitter 525 can then output its kth portion of the NPs 330 and its kth SCS 510 to precoder subsystem 530. For example, the first set-wise message splitter 525-1 outputs PS 330-1 . . . PS 330-i and also the first SCS 510-1 to precoder subsystem 530. As illustrated, the precoder subsystem 530 includes a PS precoder 532 and a SCS precoder 534. The complex gains computed and applied by a precoder are sometimes also referred to in the art as precoders, which can cause confusion. To avoid this confusion, the term "beam weights" is used herein to refer to the "precoders" generated and applied by the precoder subsystem 530. In particular, the PS precoder 532 computes PS beam weights for the PSs 330 based on individual channel vectors associated with individual target user locations 210 associated with each PS 330, and the SCS precoder 534 computes SCS beam weights for the SCSs 510 based on groups of channel vectors associated with the sets of target user locations 210 associated with each SCS 510. The precoder subsystem 530 outputs N PSs 330 weighted by the PS beam weights and K SCSs 510 weighted by the SCS beam weights.

For example, as described above, a first set of user locations 210 is associated with a first set-wise message splitter 525-1, which outputs PSs 330-1 . . . 330-i to the PS precoder 532 and outputs SCS 510-1 to the SCS precoder 534. The PS precoder 532 computes and applies the PS beam weights to PSs 330-1 . . . 330-i, and the SCS precoder 534 computes and applies the SCS beam weights to SCS 510-1. Each of transmissions 310-1 . . . 310-i includes one of the weighted PSs 330-1 . . . 330-i, respectively, and the same weighted SCS 510-1 generated by set-wise rate-splitting. In case of a user location 210 that was not assigned to any set by the channel grouping engine 530, the associated PS 330 is passed through the message splitting subsystem 520 to the PS precoder 532 without any associated SCS 510 being generated or passed to the SCS precoder 534. Thus, the corresponding transmission 310 to the ungrouped user location 210 only includes the associated PS 330.

The receivers in any kth set can be configured to only decode the kth SCS 510 generated for that set, such that the receivers of each set of user locations 210 decodes only its associated SCS 510 and its associated PS 330. In such embodiments, any of the SCSs 510 that are not decoded at a particular set of user locations 210 potentially become additional sources of interference to the streams that are decoded at that set. Embodiments carefully select which user locations 210 to group into sets and carefully design the SCS beam weights to be computed by the SCS precoder 534 so as to control additional interference caused by other SCSs 510 associated with other sets. In this way, multiple SCSs 510 can be transmitted without limiting the rate of the PSs 330.

Embodiments of the PS precoder 532 can compute PS beam weights in any suitable manner, such as MMSE, weighted MMSE, or any of several other conventional linear precoding approaches. For example, let [$w_1$ $w_2$ . . . $w_N$] denote the N private beam weight vectors, computed using MMSE or WMMSE algorithm, for a set of N user locations 210 in N cells 110. Further, assume that a pair-wise grouping algorithm, such as described above, has been applied to the N users, resulting in K user pairs $\{i_k, j_k\}$, k=1, 2, . . . K, and, $i_k$ and $j_k$ are $\in [1, \ldots N]$. For each such pair of cells $\{i_k, j_k\}$, with private beam widths $\{w_i, w_j\}$, a SCS beam weight $v_l$ can be introduced. The SCS beam weight can be computed using a signal to leakage plus noise ratio (SLNR) criterion to satisfy the following two constraints: maximize the SCS beam weight response at users $i_k$ and $j_k$, and minimize the SCS beam weight response at all other users $i_m$ and $j_m$, m=1, . . . , N, m≠k.

The first constraint ensures that the minimum decodable rate for the SCS 510-k is maximized. This is facilitated by the high collinearity basis of the user location 210 grouping approach. If the two user locations 210 in the pair have highly collinear transmit channels 340, it is possible to achieve a high response at both the user locations 210 with a single SCS beam weight vector. The second constraint ensures that the level of interference caused by the SCS 510-k to all other private streams m=1, . . . , N, m≠i, m≠j is minimized. This is also facilitated by the criteria of the user location 210 grouping approach. Users that are not paired with $i_k$ or $j_k$ have a lower degree of collinearity with $i_k$ and $j_k$. Thus, a SCS beam weight vector that has a high response at the pair $i_k$ and $j_k$ is likely to produce a lower response at a user location 210 in any other pair. Further, since user locations 210 in other pairs (or unpaired user locations 210) are likely to be some distance from the paired user locations 210, there can be room for the SCS beam weight response to fall off to a lower value.

In some embodiments, the PS beam weights and SCS beam weights are combined into a precoder matrix as follows:

$$U=[w_1 w_2 \ldots w_K v_1 v_2 \ldots v_L]$$

This combined precoder matrix accepts N+K streams as inputs (N PSs 330 and K SCSs 510) and outputs N precoded streams as the N transmissions 310 from the satellite transmitter.

Embodiments of the precoder subsystem 530 also allocate the total available transmit power $P_{tot}$ between the PSs 330 and SCSs 510. This allocation can be implemented by an iterative algorithm. One implementation of such an algorithm begins by scaling all of the PSs 330, such that all the power is allocated to the PSs 330. This can be described as follows:

$$\text{Trace}(WW^H) = P_{tot}$$

Thus, the total power in a paired set of PSs 330 $\{i_k, j_k\}$ is given by:

$$P_k = \|w_i\|^2 + \|w_j\|^2$$

This power is progressively reduced and transferred to the common stream serving the kth pair $\{i_k, j_k\}$ by scaling the common precoder $v_k$. The progressive reduction can be according to a power scalar, $\alpha$. As an example, it can be assumed that, for each kth pair of PSs 330 (corresponding to the kth pair of user locations 210), the power scalar is iteratively reduced as $\alpha = 1.0, 0.9, \ldots, 0.1, 0.0$. For each value of the power scalar (i.e., in each iteration), the following five steps can be repeated.

First, the PS beam weights $\{w_i, w_j\}$ for the kth pair can be scaled by $\alpha$, so that the total power in the private streams $\{i_k, j_k\}$ is $\alpha P_k$ (i.e., $w'_i = \sqrt{\alpha} w_i$, $w'_j = \sqrt{\alpha} w_j$).

Second, the kth SCS beam weight $v_k$ can be scaled so that the total power in the kth common stream is $(1-\alpha)P_k$ (i.e., $v'_k = v_k \sqrt{(1-\alpha)P_k / \|v_k\|^2}$).

Third, the information rates for the PSs 330 for user locations 210 corresponding to i and j are determined as:

$$R_i = \log_2\left(1 + \frac{|h_i^\dagger w'_i|^2}{\sigma^2 + \sum_{\substack{m=1 \\ m \neq i}}^{N} |h_i^\dagger w'_m|^2 + \sum_{\substack{m=1 \\ m \neq k}}^{K} |h_i^\dagger v'_m|^2}\right),$$

$$R_j = \log_2\left(1 + \frac{|h_j^\dagger w'_j|^2}{\sigma^2 + \sum_{\substack{m=1 \\ m \neq j}}^{N} |h_j^\dagger w'_m|^2 + \sum_{\substack{m=1 \\ m \neq k}}^{K} |h_j^\dagger v'_m|^2}\right).$$

The expression above uses the scaled PS beam weights and SCS beam weights. In the interference term, the interference from the kth SCS 510 common stream is excluded as it is decodable by this pair of users. The interference from all other SCSs 510 is included.

Fourth, the information rate for the kth SCS 510 is determined as:

$$R_{ck} = \min\left(\log_2\left(1 + \frac{|h_i^\dagger v'_l|^2}{\sigma^2 + \sum_{m=1}^{K} |h_i^\dagger w'_m|^2 + \sum_{\substack{m=1 \\ m \neq l}}^{L} |h_i^\dagger v'_m|^2}\right),\right.$$

$$\left.\log_2\left(1 + \frac{|h_j^\dagger v'_l|^2}{\sigma^2 + \sum_{m=1}^{K} |h_j^\dagger w'_m|^2 + \sum_{\substack{m=1 \\ m \neq l}}^{L} |h_j^\dagger v'_m|^2}\right)\right)$$

In the above expression, the information rate for the kth SCS 510 (for pair i and j) is the minimum of the information rates at i and j. Further, this information rate is computed by including the interferences from all K PSs 330 and the other (K−1) SCSs 510.

Fifth, the total information rate for the kth pair for the power scalar value being used in the present iteration can be determined as:

$$R_k = R_{ck} + R_i + R_j$$

After iterating through all values of the power scalar, embodiments can select the value (i.e., the $\alpha$) that maximizes the total rate for the pair as the optimum value. The scaled precoders corresponding to the selected power scalar value are selected as the optimum PS and SCS beam weights for the pair. In a case where $\alpha = 1$ is optimum, embodiments may not generate a SCS 510, as the optimum condition is found where no power is transferred away from the PSs 330. Otherwise, some transmit power is transferred from the PSs 330 to an associated SCS 510, thereby achieving a higher information rate for that pair of user locations 210. The same procedure can be repeated for each of the K sets of user locations 210 to select a respective optimal $\alpha$ value for each set. In some implementations, for any user location 210 not assigned to a set, only a PS beam weight (e.g., the MMSE or WMMSE precoder) is used, and the user location 210 is served only by a PS 330.

Figure 7:
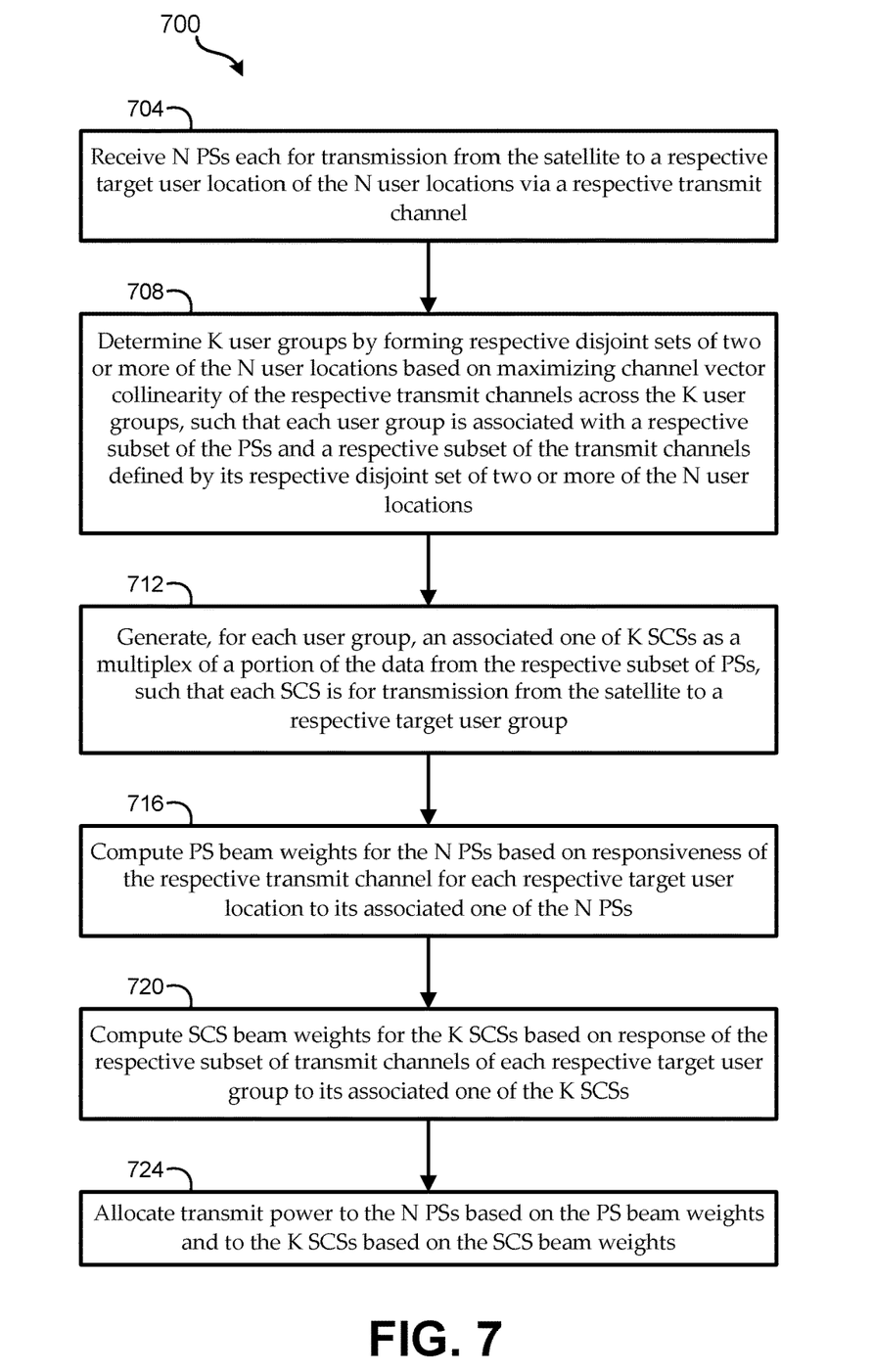
FIG. 7 shows a flow diagram of an illustrative method for precoding with set-wise rate-splitting, according to various embodiments described herein.

FIG. 7 shows a flow diagram of an illustrative method 700 for precoding with set-wise rate-splitting, according to various embodiments described herein. The method 700 can operate in context of a satellite communication network architecture having at least N user locations each in communication with a satellite via a respective one of N spot beams. Embodiments of the method 700 begin at stage 704 by receiving N private streams (PSs) each for transmission from the satellite to a respective target user location of the N user locations via a respective transmit channel.

At stage 708, embodiments can determine K user groups by forming respective disjoint sets of two or more of the N user locations based on maximizing channel vector collinearity of the respective transmit channels across the K user groups. As such, each user group is associated with a respective subset of the PSs and a respective subset of the transmit channels defined by its respective disjoint set of two or more of the N user locations. In some embodiments, the determining the K user groups at stage 708 includes: computing, for each permutation of S user locations out of the N user locations, a respective collinearity value based on channel vectors of the respective transmit channels associated with the S user locations, each permutation being one of a candidate set; and iteratively determining each kth user group of the K user groups, where k is an integer from 1 to K, by: identifying a permutation of the candidate set as having a highest respective collinearity value and assigning the S user locations of the identified permutation as the kth user group; and removing from the candidate set all permutations that include any of the S user locations of the identified permutation. Some such embodiments further estimate the channel vectors for each of the N transmit channels. In some such embodiments, the iterations continue until (i.e., the iteratively determining involves iterating until) either: all of the N user locations are assigned to one of the K user groups, or none of the respective collinearity values of the candidate set is at least a predetermined minimum collinearity threshold. Some such embodiments, for each kth user group of the K user groups, further determine whether the respective collinearity value of the identified permutation is at least a predetermined minimum collinearity threshold; the assigning the S user locations of the identified permutation as the kth user group is performed only if the respective collinearity value of the identified permutation is at least the predetermined minimum collinearity threshold.

At stage 712, embodiments can generate, for each user group, an associated one of K set-wise common streams (SCSs) as a multiplex of a portion of the data from the respective subset of PSs, such that each SCS is for transmission from the satellite to a respective target user group. In some embodiments, generating the associated one of the K SCSs for each user group at stage 712 includes selecting an information rate for the associated one of the K SCSs that is decodable by all of the respective disjoint set of two or more of the N user locations corresponding to the user group.

At stage 716, embodiments can compute PS beam weights for the N PSs based on responsiveness of the respective transmit channel for each respective target user location to its associated one of the N PSs. For example, the PS beam weights are computed such that the responsiveness of the respective transmit channel for each respective target user location is maximized with respect to its associated one of the N PSs and is minimized with respect to all others of the N PSs. At stage 720, embodiments can compute SCS beam weights for the K SCSs based on responsiveness of the respective subset of transmit channels of each respective target user group to its associated one of the K SCSs. For example, the SCS beam weights are computed such that the responsiveness of the respective subset of transmit channels for each respective target user group is maximized with respect to its associated one of the K SCSs and is minimized with respect to all others of the K SCSs.

At stage 724, embodiments can allocate transmit power to the N PSs based on the PS beam weights and to the K SCSs based on the SCS beam weights. In some embodiments, the allocating at stage 724 can include iteratively selecting a power scalar value to maximize information rate for each kth user group of the K user groups, where k is an integer from 1 to K. Iteratively selecting the power scalar value can be performed by, for each power scalar value of a plurality of power scalar values: scaling the PS beam weights and the SCS beam weights based on the power scalar value to allocate a total available transmit power between the kth respective subset of the PSs and the kth SCS; and computing a total information rate for transmitting the kth respective subset of the PSs and the kth SCS based on the scaling for the power scalar value. One of the plurality of power scalar values can then be selected as the one that yields the highest total information rate for the kth user group. Then, for each user group, embodiments can allocate a respective portion of the transmit power to the kth respective subset of the PSs based on scaling corresponding ones of the PS beam weights based on the selected one of the plurality of power scalar values; and embodiments can allocate a respective portion of the transmit power to the kth SCS for the kth user group based on scaling a corresponding one of the SCS beam weights based on the selected one of the plurality of power scalar values.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for precoding with set-wise rate-splitting in a satellite communication network architecture having at least N user locations each in communication with a multi-beam satellite, the system comprising:
   a message splitting subsystem configured to receive N private streams (PSs) each for transmission from the multi-beam satellite to a respective target user location of the N user locations via a respective transmit channel, and comprising:
      a channel grouping engine to determine K user groups by maximizing channel vector collinearity of the respective transmit channels, wherein the channel grouping engine computes collinearity values for permutations of S user locations out of the N user locations, each permutation forming a candidate group, and the channel grouping engine iteratively selects K user groups by identifying, at each iteration, the candidate group with the highest collinearity value, assigning its S user locations as a current user group, and removing from further consideration any candidate groups including the assigned user locations, such that each user group is associated with a respective subset of the PSs and a respective subset of the transmit channels defined by its respective user locations; and K set-wise message splitters, each to generate for a respective user group, an associated one of K set-wise common streams (SCSs) as a multiplex of a portion of data from the respective subset of PSs, such that each SCS is for transmission from the multi-beam satellite to a respective target user group; and a precoder subsystem coupled with the message splitting subsystem and comprising:

a PS precoder to compute PS beam weights for the N PSs based on responsiveness of the respective transmit channel for each respective target user location to its associated one of the N PSs; and a SCS precoder to compute SCS beam weights for the K SCSs based on responsiveness of the respective subset of transmit channels of each respective target user group to its associated one of the K SCSs, wherein the precoder subsystem is configured to allocate transmit power to the N PSs based on the PS beam weights and to the K SCSs based on the SCS beam weights.

2. The system of claim 1, wherein:

the iteratively selecting comprises iterating until either: all of the N user locations are assigned to one of the K user groups, or none of the respective collinearity values of candidate set is at least a predetermined minimum collinearity threshold.

3. The system of claim 1, wherein:

for each kth user group of the K user groups, the iteratively selecting further comprises determining whether the respective collinearity value of the identified permutation is at least a predetermined minimum collinearity threshold; and the assigning the S user locations of the identified permutation as the kth user group is performed only if the respective collinearity value of the identified permutation is at least the predetermined minimum collinearity threshold.

4. The system of claim 1, wherein the determining the K user groups further comprises:

estimating the channel vector for each of the N transmit channels.

5. The system of claim 1, wherein the K set-wise message splitters are to generate the associated one of the K SCSs for each user group by selecting an information rate for the associated one of the K SCSs that is decodable by all of the respective user locations corresponding to the user group.

6. The system of claim 1, wherein the PS precoder is to compute the PS beam weights such that the responsiveness of the respective transmit channel for each respective target user location is maximized with respect to its associated one of the N PSs and is minimized with respect to all others of the N PSs.

7. The system of claim 1, wherein the SCS precoder is to compute the SCS beam weights such that the responsiveness of the respective subset of transmit channels for each respective target user group is maximized with respect to its associated one of the K SCSs and is minimized with respect to all others of the K SCSs.

8. The system of claim 1, wherein the precoder subsystem is to allocate the transmit power to the N PSs based on the PS beam weights and to the K SCSs based on the SCS beam weights by, for each kth user group of the K user groups, where k is an integer from 1 to K:

for each power scalar value of a plurality of power scalar values:

scaling the PS beam weights and the SCS beam weights based on the power scalar value to allocate a total available transmit power between the kth respective subset of the PSs and the kth SCS; and computing a total information rate for transmitting the kth respective subset of the PSs and the kth SCS based on the scaling for the power scalar value;

selecting one of the plurality of power scalar values at which the computing yields a highest total information rate;

allocating a respective portion of the transmit power to the kth respective subset of the PSs based on scaling corresponding ones of the PS beam weights based on the selected one of the plurality of power scalar values; and allocating a respective portion of the transmit power to the kth SCS for the kth user group based on scaling a corresponding one of the SCS beam weights based on the selected one of the plurality of power scalar values.

9. The system of claim 1, wherein each user group corresponds to a respective pair of the N user locations.

10. The system of claim 1, wherein, in each user group:

a first of the user locations is in a first coverage area of a first spot beam of the multi-beam satellite;

a second of the user locations is in a second coverage area of a second spot beam of the multi-beam satellite;

the first and second spot beams are of a same color; and the first and second coverage areas are geographically adjacent.

11. A method for precoding with set-wise rate-splitting in a satellite communication network architecture having at least N user locations each in communication with a satellite via a respective one of N spot beams, the method comprising:

receiving N private streams (PSs) each for transmission from the satellite to a respective target user location of the N user locations via a respective transmit channel;

determining K user groups by maximizing channel vector collinearity of the respective transmit channels, wherein determining the K user groups comprises computing collinearity values for permutations of S user locations out of the N user locations, each permutation forming a candidate group, and iteratively selecting K user groups by identifying, at each iteration, the candidate group with the highest collinearity value, assigning its S user locations as a current user group, and removing from further consideration any candidate groups including the assigned user locations;

generating, for each user group, an associated one of K set-wise common streams (SCSs) as a multiplex of a portion of data from the respective subset of PSs, such that each SCS is for transmission from the satellite to a respective target user group;

computing PS beam weights for the N PSs based on responsiveness of the respective transmit channel for each respective target user location to its associated one of the N PSs;

computing SCS beam weights for the K SCSs based on responsiveness of the respective subset of transmit channels of each respective target user group to its associated one of the K SCSs; and allocating transmit power to the N PSs based on the PS beam weights and to the K SCSs based on the SCS beam weights.

12. The method of claim 11, wherein:

the iteratively selecting comprises iterating until either: all of the N user locations are assigned to one of the K user groups, or none of the respective collinearity values of the candidate set is at least a predetermined minimum collinearity threshold.

13. The method of claim 11, wherein:

for each kth user group of the K user groups, further determining whether the respective collinearity value of the identified permutation is at least a predetermined minimum collinearity threshold; and the assigning the S user locations of the identified permutation as the kth user group is performed only if the respective collinearity value of the identified permutation is at least the predetermined minimum collinearity threshold.

14. The method of claim 11, wherein the determining the K user groups further comprises:

estimating the channel vector for each of the N transmit channels.

15. The method of claim 11, wherein the generating the associated one of the K SCSs for each user group comprises selecting an information rate for the associated one of the K SCSs that is decodable by all of the respective user locations corresponding to the user group.

16. The method of claim 11, wherein the PS beam weights are computed such that the responsiveness of the respective transmit channel for each respective target user location is maximized with respect to its associated one of the N PSs and is minimized with respect to all others of the N PSs.

17. The method of claim 11, wherein the SCS beam weights are computed such that the responsiveness of the respective subset of transmit channels for each respective target user group is maximized with respect to its associated one of the K SCSs and is minimized with respect to all others of the K SCSs.

18. The method of claim 11, wherein the allocating the transmit power to the N PSs based on the PS beam weights and to the K SCSs based on the SCS beam weights comprises, for each kth user group of the K user groups, where k is an integer from 1 to K:

for each power scalar value of a plurality of power scalar values:

scaling the PS beam weights and the SCS beam weights based on the power scalar value to allocate a total available transmit power between the kth respective subset of the PSs and the kth SCS; and computing a total information rate for transmitting the kth respective subset of the PSs and the kth SCS based on the scaling for the power scalar value;

selecting one of the plurality of power scalar values at which the computing yields a highest total information rate;

allocating a respective portion of the transmit power to the kth respective subset of the PSs based on scaling corresponding ones of the PS beam weights based on the selected one of the plurality of power scalar values; and allocating a respective portion of the transmit power to the kth SCS for the kth user group based on scaling a corresponding one of the SCS beam weights based on the selected one of the plurality of power scalar values.

* * * * *